Nov. 17, 1970     D. N. MARTIN     3,540,857

SAMPLE CAPSULE AND FILTERING MECHANISM

Filed Jan. 22, 1968

INVENTOR.
DONALD N. MARTIN
BY
*Paul L. Harder*
ATTORNEY

United States Patent Office 3,540,857
Patented Nov. 17, 1970

3,540,857
SAMPLE CAPSULE AND FILTERING MECHANISM
Donald N. Martin, Whittier, Calif., assignor to Beckman Instruments, Inc., a corporation of California
Filed Jan. 22, 1968, Ser. No. 699,520
Int. Cl. B01d 29/36
U.S. Cl. 23—292    9 Claims

ABSTRACT OF THE DISCLOSURE

A sample holder of double wall construction having a filter and a cup with double sidewalls, notches in the lower edge of an inner sidewall communicating with an annular space between the sidewalls. The cup is adapted to be pressurized by air, while held in sealing engagement by a mechanical ram, for forcing reacted fluid through the annular space and the filter which traps solids and permits only the filtrate to pass to another cup.

---

This application is related to applications Ser. No. 699,682 for Sample Holder With Filter Means by Hugh O. Brown et al. and Ser. No. 699,486 for Sample Holder With Centrifugation Means by Jerry E. Rochte, both filed concurrently herewith.

The present invention relates to automated chemical analyzers and more particularly to wet chemical or clinical sample holders or capsules having a mechanism for filtering a liquid carried by the capsule.

During the processing of wet chemicals or clinical liquids it is often necessary to add a reagent to a fluid for reacting the same; for example, the addition of tungstic acid to diluted blood serum for precipitation of the blood protein. However, before analysis may proceed further, the precipitant must be filtered out since its presence interferes with such analysis and is therefore undesirable. It has been proposed to apply pressure to the reacted fluid, as by means of an expanding bladder or a pair of opposing external rams, for forcing the fluid through a filter which traps the solids therein and thereby provides a clear filtrate for further analysis.

It is an object of the present invention to provide a new and improved means for forcing the filtrate through a filter.

Another object is the provision of a modified form of sample holder for filtering the reacted fluid in a facile and reliable manner while contained in the holder.

For the achievement of the aforementioned objects and other advantages, the present invention contemplates and is concerned with a sample holder having a container of double sidewall construction and a mechanism, including an air pressure line and a ram, for forcing the reacted fluid between the double sidewalls of the container and through a filter adjacent to the container to provide a clear filtrate for further analysis.

Other objects, advantages and features of the present invention will become better understood by reference to the following description when considered in connection with the accompanying drawing wherein.

Figure 1:
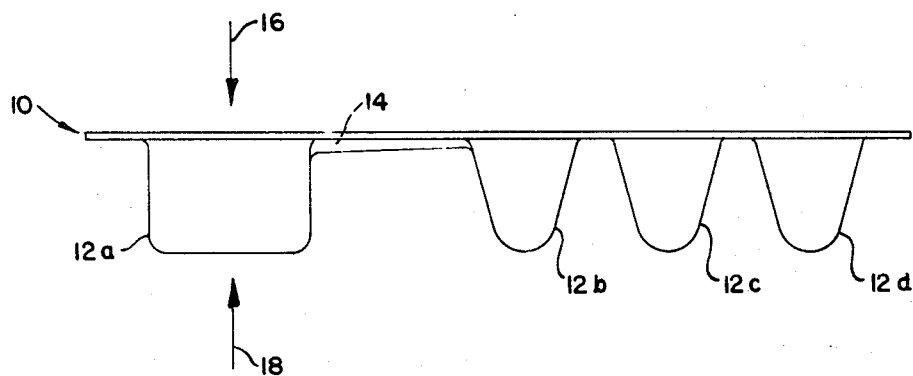
FIG. 1 is a schematic view illustrating a sample holder and filtering mechanism embodying the principles of the present invention.

Referring now to the drawing, there is schematically illustrated in FIG. 1 a sample holder or capsule 10 having compartments or cups 12a, b, c and d, and a filter 14, the capsule being adapted to be positioned between two sources of pressure, represented by the arrows 16 and 18, which cooperate to force fluid out of cup 12a through filter 14 and into cup 12b.

Figure 2:
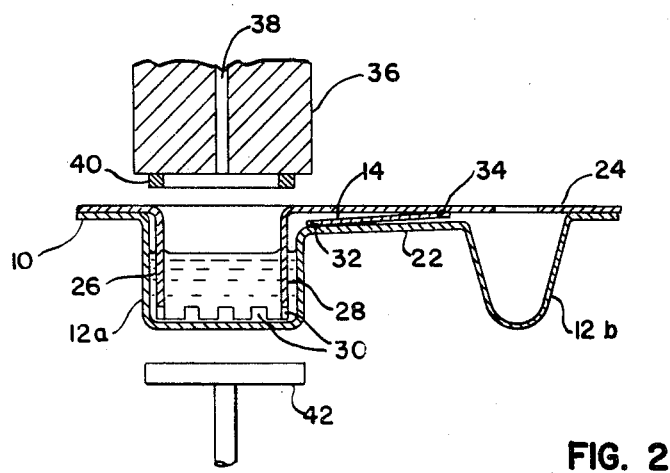
FIG. 2 is a fragmentary sectional view, on a larger scale, illustrating features of the invention.

As better seen in FIG. 2, capsule 10 includes a bottom structure or body member 22 and a top structure or a cover 24, suitably sealed to each other. It will be noted that the cups 12a and 12b are formed in body member 22 and that cover 24 has a bottomless wall portion 26 extending into cup 12a and spaced from the sidewalls thereof to provide a double sidewall construction defining an annular space 28. Although the sidewalls of cup 12a and wall portion 26 are shown as being substantially cylindrical, it will be appreciated that other shapes would serve as well which could be generally concentrically disposed to provide a generally annular space therebetween. Wall portion 26 terminates adjacent the bottom of cup 12a and has notches 30 formed in its lower edge for flow of fluid therethrough to serve a purpose later appearing. The capsule 10 is constructed of a pliable material, such as a plastic or plasticized paper or the like, having sufficient rigidity to withstand the application of mechanical pressure to the bottom of the compartments or cups 12a–d and the application of air pressure to the interior thereof.

Filter 14 may be a sheet of porous material, for example, filter paper, and have one edge thereof sealed to the body member, as at 32, another edge sealed to the cover, as at 34, and its side edges (not shown) sealed to the body member and cover.

Figure 3:
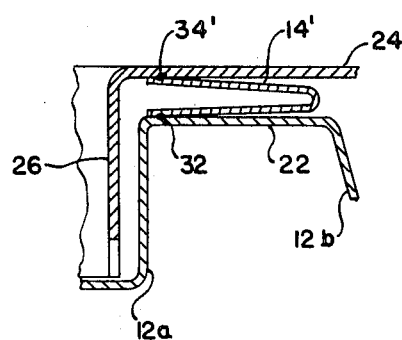
FIG. 3 is a fragmentary detail view of an alternate form of filter.

FIG. 3 illustrates an alternate form of filter 14' in which the sheet of filter material is doubled over and the upper edge thereof is sealed to the cover above seal 32, as at 34', thereby providing an envelope which receives the fluid for filtering.

Returning to FIG. 2, to cause filtering of a fluid contained in cup 12a, the cup is positioned beneath a pneumatic pressure mechanism, for example, an anvil 36 having an air passageway 38 therethrough and a seal 40, of soft or sponge rubber or the like, on its lower end encompassing the passageway. In such position, cup 12a will be disposed over a mechanical pressure mechanism, for example, a movable ram 42.

OPERATION

In operation, when cup 12a has been positioned as described hereinabove, the ram 42 moves upwardly against the bottom of the cup for sealing the top of the cup to the anvil 36 by means of seal 40. Air then flows through passageway 38 and pressurizes the cup, forcing fluid through the notches 30 and up between the double sidewalls of the cup through annular space 28 and the filter 14, which traps the solids and permits only the filtrate to pass into cup 12b. Alternatively, of course, the anvil 36 could be made to move to effect sealing, or the ram and the anvil both move.

There has thus been provided a sample capsule and filtering mechanism which performs filtering of a fluid in a reliable and facile manner while contained in the capsule and does it with new and improved mechanisms.

Although the present invention has been described in detail in connection with one illustrative embodiment, it should be understood that the novelty of the invention is not limited to the specific embodiment illustrated and described but is defined only by the scope of the appended claims.

What is claimed is:
1. A sample capsule comprising, in combination:
   a bottom body member having a plurality of compartments formed therein;
   a cover superimposed on said body member and having a depending bottomless wall portion extending into one of said compartments and defining therewith an annular space; and a filter disposed between said body member and cover adjacent said one compartment.

2. The capsule as defined in claim 1 wherein:
said wall portion has a lower edge provided with notches therein.

3. The combination as defined in claim 1 wherein:
said capsule is constructed of a pliable material having sufficient rigidity to withstand the application of mechanical pressure to the bottom of said one compartment and the application of air pressure to the interior thereof.

4. The capsule as defined in claim 1 wherein:
said one compartment has a substantially cylindrical sidewall; and
said wall portion is substantially cylindrical and generally concentric of said cylindrical sidewall.

5. The combination as defined in claim 4 wherein:
said wall portion terminates adjacent the bottom of said one compartment and has notches in its lower edge.

6. A sample capsule and mechanism for filtering a fluid comprising, in combination:
a sample capsule having a compartment therein and a filter adjacent thereto, said compartment adapted to contain a fluid requiring filtering;
said compartment being of double sidewall construction providing inner and outer sidewalls thereby defining an inner space within the inner sidewall and an annular outer space between said sidewalls; and
means for forcing the fluid from said inner space, through said outer annular space and said filter, said means including a mechanical pressure mechanism and a pneumatic pressure mechanism.

7. The combination as defined in claim 6 wherein said sidewalls are generally concentric, with the inner one of said sidewalls having notches formed in the lower edge thereof through which said fluid passes to said annular space.

8. A sample capsule and mechanism for filtering a fluid comprising, in combination:
a sample capsule having a compartment therein and a filter adjacent thereto, said compartment adapted to contain a fluid requiring filtering;
means for forcing the fluid from said compartment and through said filter, said means including a mechanical pressure mechanism and a pneumatic pressure mechanism;
said mechanical pressure mechanism including a movable ram; and
said pneumatic pressure mechanism including an anvil having an air passageway therethrough and a seal encompassing the passageway.

9. A sample capsule and mechanism for filtering a fluid comprising, in combination:
a sample capsule having a compartment therein and a filter adjacent thereto, said compartment being adapted to contain a fluid requiring filtering;
said capsule being of double wall construction including a body member and cover;
said filter being disposed between said body member and said cover;
said compartment being of double sidewall construction providing a pair of generally concentric sidewalls with an annular space therebetween;
the inner one of said sidewalls having notches formed in the lower edge thereof;
means for forcing the fluid from said compartment and through said filter, said means including a mechanical pressure mechanism and a pneumatic pressure mechanism;
said mechanical pressure mechanism including a movable ram; and
said pneumatic pressure mechanism including an anvil having an air passageway therethrough and a seal encompassing the passageway.

References Cited

UNITED STATES PATENTS 2,343,113  2/1944  Jones _____ 210—445 XR
2,529,395  11/1950  Hummel _____ 210—416 XR MORRIS O. WOLK, Primary Examiner R. M. REESE, Assistant Examiner U.S. Cl. X.R.
23—253; 210—416